N. HUTH.
BAKER'S DOUBLE TIN STICK LADY LOCK PAN.
APPLICATION FILED JAN. 15, 1914. RENEWED SEPT. 23, 1914.
1,139,037.
Patented May 11, 1915.
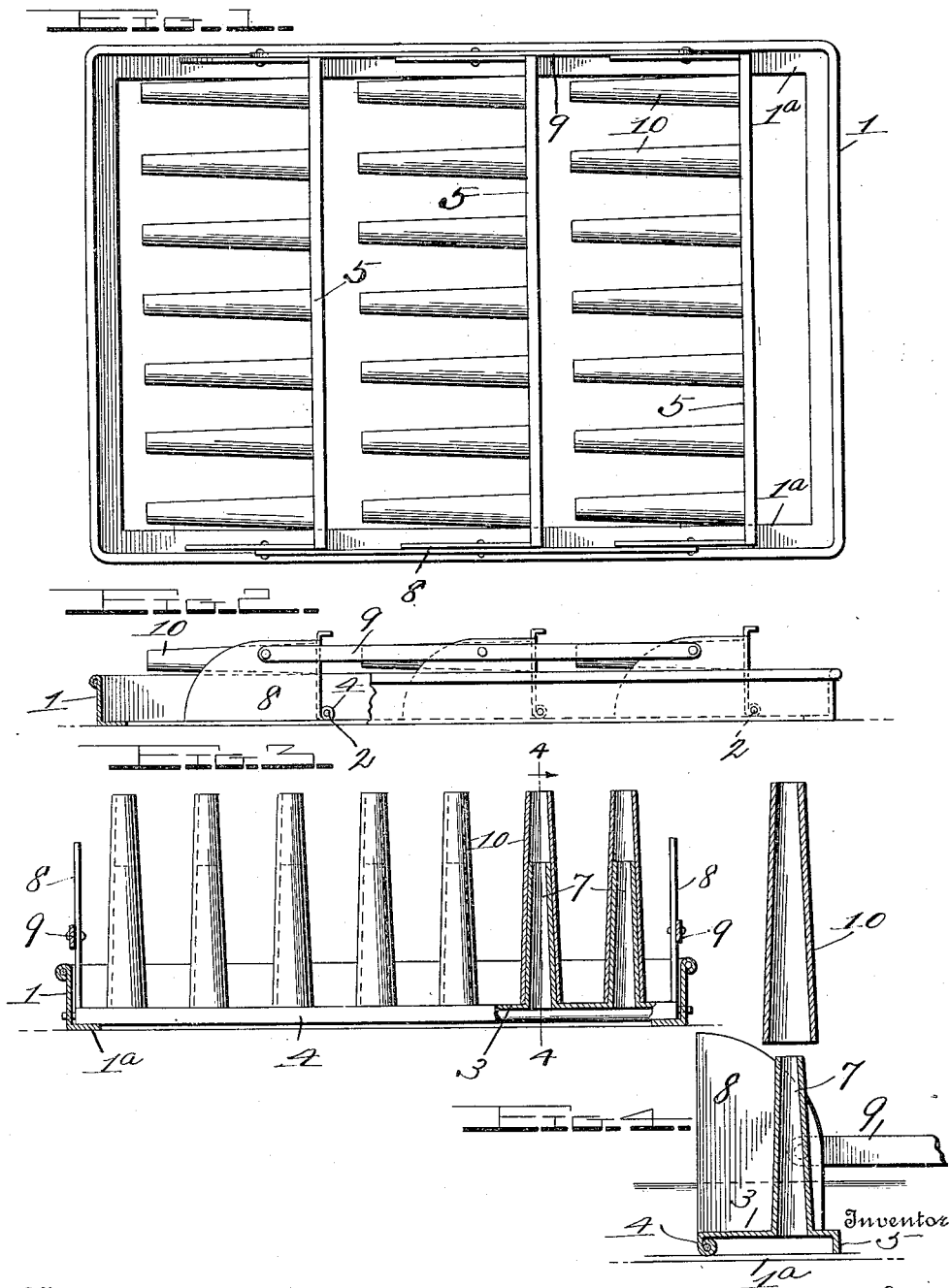

UNITED STATES PATENT OFFICE.

NATHANIEL HUTH, OF BROOKVILLE, PENNSYLVANIA.

BAKER'S DOUBLE TIN STICK LADY-LOCK PAN.

1,139,037. Specification of Letters Patent. Patented May 11, 1915.

Application filed January 15, 1914, Serial No. 812,313. Renewed September 23, 1914. Serial No. 863,219.

*To all whom it may concern:*

Be it known that I, NATHANIEL HUTH, a citizen of the United States, residing at Brookville, in the county of Jefferson and State of Pennsylvania, have invented a new and useful Improvement in Bakers' Double Tin Stick Lady-Lock Pans, of which the following is a specification.

This invention relates to a device especially adapted for the baking of an article of confectionery known to the trade as ladylocks, said articles usually comprising the substantially cone-shaped cake of dough or puffed paste, and filled with cream or starch, the materials employed for forming the cone-shaped shell and the filling being regulated by the price at which the confection is to be sold.

It has heretofore been the custom to bake the cones by laying them either directly upon the bottoms of the ovens or in suitable pans but in all such cases, said cones when removed from the oven are slightly flattened upon one side and are very often scorched upon the flattened side.

The object of this invention is to bake the cones while in a suspended position; to insure uniform baking upon every side of the exterior; to prevent flattening of any side, and also to insure baking of the inside as uniformly as upon the exterior, which is not always accomplished when the device is laid directly upon the bottom of an oven or pan. By having the cones suspended above the bottom of the oven there is a free circulation around all sides as well as through the cones.

A further object of the invention is to facilitate placing of the cones in position by providing formers which are removable from the holding means and which can be readily slipped in position, and when so positioned to form not only a part of the cone supporting means as well as acting as a core but also form a continuation of a flue by means of which heat is passed to the interior of the cone.

With these objects in view, the invention consists of the novel features of construction hereinafter described, pointed out in the claims and shown in the accompanying drawings, in which, Figure 1 is a plan view, the formers being shown in position upon the cones, the parts being shown in the position occupied during the baking operation. Fig. 2 is a side elevation of Fig. 1 partly broken away, and partly in section. Fig. 3 is a transverse section through the device, the formers and flues being shown in upright position and two of them being shown in longitudinal section. Fig. 4 is a section on the line 4—4 of Fig. 3, slightly enlarged and a former being lifted upwardly and shown in the position occupied by it when being placed upon or removed from one of the flues.

In the drawings 1 represents a skeleton pan the bottom of which is cut out. Suitable wires 2 extend across the pan and suitable bars 3 have their front edges rolled over to form sleeves 4 which inclose the wires 2 and turn upon said wires. The bars may therefore be described as being hinged at their front edges to said wires. The rear edge of each bar is provided with a right-angled flange 5 which when the bars are swung into horizontal position rest upon a flange 1ª of the pan. Carried by the bars are a plurality of cone-shaped flues 7 open at the top and opening at the bottom through the bars and these flues may be integral with the bars or secured to them in any desired manner. To support the bars when the said bars are swung into a vertical position flanges 8 are carried by said bars, said flanges resting upon the flanges 1ª of the pan when the bars are standing vertically.

It will be noted that when the bars are in a vertical position the flues 7 occupy a horizontal position and vice versa. In order that all of the bars and flues may be readily swung into the desired position at one time I employ side links 9 which are loosely pivoted to the flanges 8 so that the lifting or lowering of one set of flues will operate all of the others. Formers 10 are provided which are similar in shape and construction to the flues 7 but of greater length and of such diameter as to fit over said flues.

In using the device the pie dough or puffed paste from which the shell of the lady-lock is to be formed is rolled about the former 10. The formers are then slipped into position over the flues 7, said flues being in an upright position to facilitate the placing of the formers in position. When so positioned the formers 10 not only serve as a core for the lady-lock shell and also as a support for the same but they also form a continuation of the flue. After the formers are placed in position upon the flues they are swung down into horizontal position as shown in Figs. 1 and 2 and the pan is then slipped into the oven. When the baking operation has been completed, the pan is removed from the oven, the formers swung back into upright position and they are then readily slipped from the flue and the baked shells or cones readily stripped from the formers and may then be filled with the desired cream, paste, starch, or other confection which it may be desired to place in them. The pans may be of any size, any number of bars may be employed, and there may be any desired number of flues placed upon each bar.

What I claim is:—

1. A device of the kind described comprising a flue, means carrying said flue and movable to bring said flue into either upright or horizontal position and a former fitting over said flue and adapted when in position to form a continuation thereof.

2. A device of the kind described comprising a bar adapted to swing from a horizontal to a vertical position, a plurality of flues open at each end carried by the bar and formers adapted to fit upon said flues.

3. A device of the kind described comprising a bar adapted to swing from a horizontal to a vertical position, a plurality of flues open at each end carried by the bar and formers adapted to fit upon said flues, and of greater length than the flues.

4. A device of the kind described comprising a skeleton pan, a series of hinged bars carried by said pan, flues arranged upon said bars and opening through said bars, and formers adapted to fit over and form a continuation of said flues.

5. A device of the kind described comprising a pan, cross bars pivotally arranged within said pan, flues open at each end carried by the bars, formers adapted to fit upon said flues, and means connecting said bars together, thereby causing all of said bars to swing in unison.

6. A lady-lock baking device comprising a metal cone open at both ends, means for carrying said cone, said means being adjustable thereby permitting the cone to assume either an upright or a horizontal position, and a second cone adapted to form a core for the lady-lock shell, said second cone being adapted to fit over the first mentioned cone and removable therefrom.

NATHANIEL HUTH.

Witnesses:
J. M. Frazier,
Charles G. McLain.

Copies of this patent may be obtained for five cents each, by addressing the "Commissioner of Patents, Washington, D. C."